United States Patent
Krochmal

(10) Patent No.: US 11,206,201 B2
(45) Date of Patent: Dec. 21, 2021

(54) DETECTION OF A NETWORK ISSUE WITH A SINGLE DEVICE

(71) Applicant: Apple Inc., Cupertino, CA (US)

(72) Inventor: Marc J. Krochmal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/673,223

(22) Filed: Nov. 4, 2019

(65) Prior Publication Data

US 2021/0067429 A1    Mar. 4, 2021

Related U.S. Application Data

(60) Provisional application No. 62/894,297, filed on Aug. 30, 2019.

(51) Int. Cl.
```
G06F 15/173    (2006.01)
H04L 12/26     (2006.01)
H04L 29/08     (2006.01)
H04L 29/12     (2006.01)
```
(52) U.S. Cl.
CPC ........ H04L 43/065 (2013.01); H04L 43/0841 (2013.01); H04L 67/16 (2013.01); H04L 61/6022 (2013.01)

(58) Field of Classification Search
CPC combination set(s) only.
See application file for complete search history.

(56) References Cited

U.S. PATENT DOCUMENTS

| | | | |
|---|---|---|---|
| 6,118,768 A * | 9/2000 | Bhatia | H04L 12/2856 370/254 |
| 7,853,703 B1 | 12/2010 | McBarron et al. | |
| 2007/0133576 A1* | 6/2007 | Tsuge | H04L 41/0226 370/401 |
| 2008/0181213 A1* | 7/2008 | Ovsiannikov | H04L 63/0281 370/389 |
| 2016/0026683 A1* | 1/2016 | Sah | G06F 16/2453 707/770 |
| 2016/0227265 A1* | 8/2016 | Harrison | H04L 65/00 |

(Continued)

OTHER PUBLICATIONS

"Best Practices for Using Multiple Network Interfaces (NICs) with NI Products." Published Mar. 24, 2011. Downloaded from: www.ni.com/product-documentation/12558/en/. 7 pages.

(Continued)

*Primary Examiner* — Umar Cheema
*Assistant Examiner* — Tesfu N Mekonen
(74) *Attorney, Agent, or Firm* — Kilpatrick Townsend & Stockton LLP

(57) ABSTRACT

Methods and systems are provided for detecting network device configurations using a single device. The methods and system include establishing a first connection to a network device using a first device identifier. Upon detecting that a condition has been satisfied; a second connection to the network device can be established. A data packet can be transmitted over one of the first connection or the second connection, the data packet being addressed to the network address associated with the other connection. Upon detecting whether the data packet is received over the other connection, an error message can be transmitted when the data packet is not received over the other connection.

20 Claims, 7 Drawing Sheets

(56) References Cited

U.S. PATENT DOCUMENTS

2018/0146420 A1* 5/2018 Wang .................... H04L 63/083
2019/0104048 A1* 4/2019 Nainar ................... H04L 45/021
2020/0228492 A1* 7/2020 Kucera .................. H04L 45/24

OTHER PUBLICATIONS

BlazeMeter, "Using IP Spoofing to Simulate Requests from Different IP Addresses with JMeter." Published Jun. 9, 2015. Downloaded from: https://www.blazemeter.com/blog/using-ip-spoofing-simulate-reqests-different-ip-addresses-jmeter. 19 pages.

* cited by examiner

DETECTION OF A NETWORK ISSUE WITH A SINGLE DEVICE

CROSS-REFERENCES TO RELATED APPLICATIONS

This application claims the benefit of U.S. Provisional Application No. 62/894,297, filed Aug. 30, 2019, entitled "DETECTION OF A NETWORK ISSUE WITH A SINGLE DEVICE." The disclosure of this application is incorporated by reference herein in its entirety.

BACKGROUND

Modern mobile devices (e.g., smartphones) may connect to a variety of disparate networks to communicate, obtain information, or obtain services. For instance, in some networks, mobile devices may be connected to display devices that are within the network and stream content to the display device. Those mobile devices may also connect to external devices such as web servers that host websites, audiovisual content, or video games that provide a multiplayer experience. In addition, many mobile devices may also connect to a number of semi-private networks such as an office and a number of public networks such as airports, coffee shops, venues, etc.

Some networks may provide certain level of security for the devices connected to the network. Frequently, the network's operator can set passwords, determine acceptable devices and excluded devices, set firewalls, and the like. Other networks are designed to be more accepting of diverse groups of often unrelated devices and users. As a result, these networks tend to be more secure in some aspects and less secure in other aspects. For instance, many of these types of networks are considered "unsecured" in that the network does not require a password to connect. While this may simplify access to the network, it may also enable devices within the network to hack other devices within the network. To prevent this, some networks restrict access to some communication protocols, ports, etc. Yet, restricting access may have an unintended effect of blocking many innocent features and service provided by devices.

Thus, improvements to managing network configurations using devices connected to the network is desired.

BRIEF SUMMARY

Aspects of the present disclosure include methods for detecting the configuration of network devices using a single device. The method includes establishing, by a computing device, a first connection to a network device using a first device identifier and receiving, from the network device, a first network address for the computing device for the first connection. Upon detecting that a condition has been satisfied, the method continues by generating a second device identifier for the computing device, the second device identifier being a virtual identifier that is different than the first device identifier, and establishing, a second connection to the network device. The computing device can maintain the first connection and the second connection at a same time. The method continues by receiving, from the network device, a second network address for the computing device for the second connection and transmitting a data packet over one of the first connection or the second connection, the data packet being addressed to the network address associated with the other connection. Upon detecting whether the data packet is received over the other connection, an error message can be transmitted when the data packet is not received over the other connection.

Another aspect of the present disclosure includes a system comprising one or more processors and a non-transitory computer-readable media that includes instructions that when executed by the one or more processors, cause the one or more processors to perform methods described above.

Other aspects of the present disclosure include a non-transitory computer-readable media that includes instructions that when executed by one or more processors, cause the one or more processors to perform the methods described above.

A better understanding of the nature and advantages of embodiments of the present disclosure may be gained with reference to the following detailed description and the accompanying drawings.

DETAILED DESCRIPTION

Methods and systems are disclosed herein for detecting network device configurations using a single device. To address such a problem with the configuration of a network device, a mobile device that is already connected to the network device (e.g., a router) may establish a second connection with the network device using a virtual device identifier generated by the mobile device. The mobile device may transmit data packets through one connection addressed to the second connection. By monitoring the data packet, the configuration of the network device may be determined.

Detecting the network device configuration may enable devices within the network to communicate directly (e.g., through the network device) with each other regardless of the network device configuration. For instance, the network device may enable or disable direct communications between devices that connected to the network device. If the particular configuration is unknown, the devices of network may not be able to distinguish the cause of communication errors. For instance, the communication error may be caused by the transmitting device, the receiving device, the network device, etc. There may not be a means to determine that the root cause of the error is the particular configuration of the network device. If the configuration of the network device can be determined, the devices of the network may isolate the cause of communication errors more effectively and a take remedial action. For instance, if the mobile determines that direct communications are disabled by the network device, the mobile device may establish a proxy connection through a different remote device to establish communications with another device within the network. The use of a single device to detect the configuration of the network device enables network diagnostics where other devices of the network are outside the control of the mobile device user or are otherwise inaccessible.

I. Local Network Configuration

Figure 1:
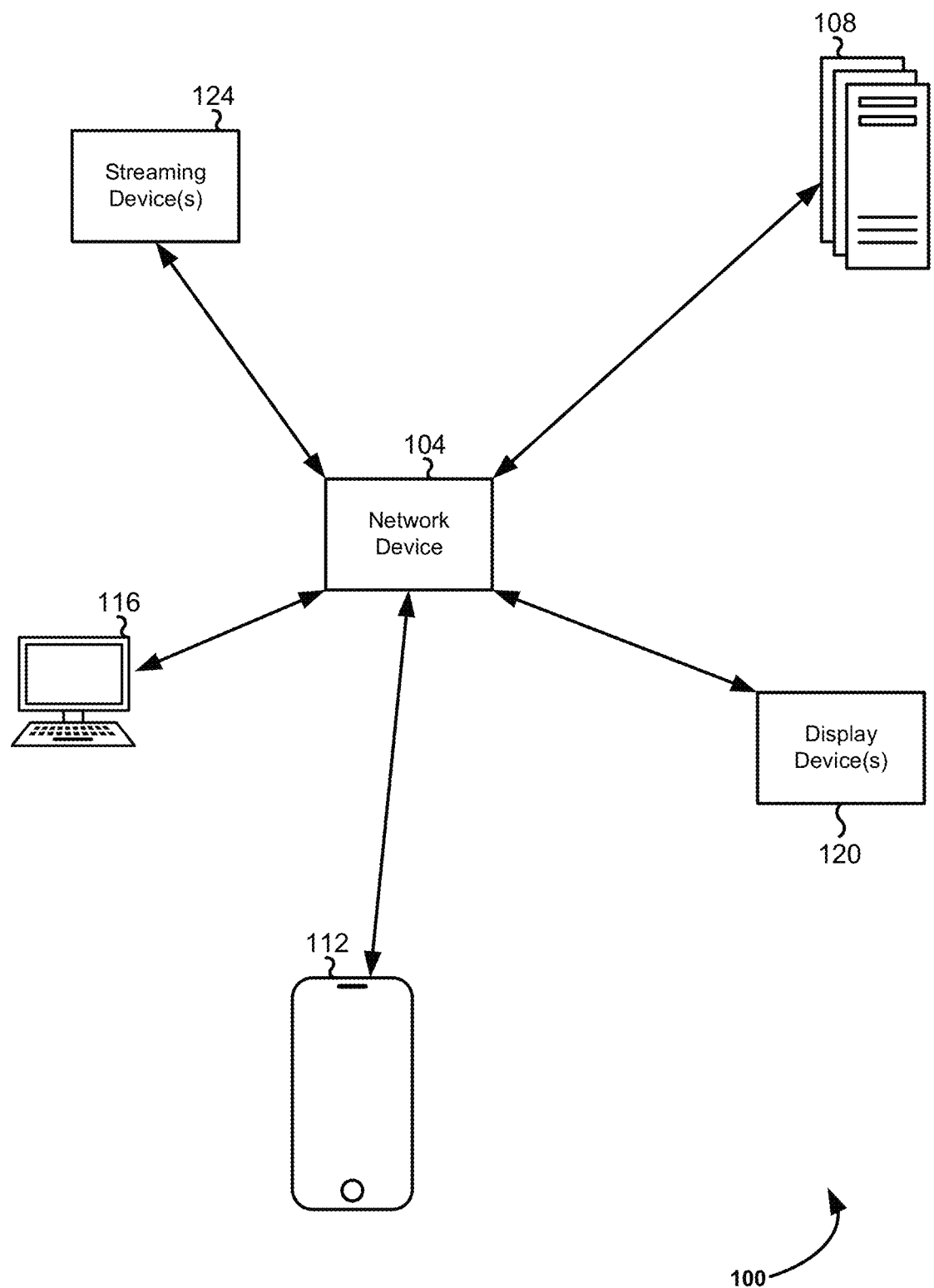
FIG. 1 illustrates and exemplary network according to at least one aspect of the present disclosure.

FIG. 1 illustrates and a network 100 according to at least one aspect of the present disclosure. Network 100 may include a network device 104 that operates as central hub for devices in the network. Network device 104 may be any type of device that facilitates communications between devices such as, but not limited to, a gateway router, interior router, exterior router, network switch, and the like. Network device 104 may operate as a local area network (LAN), wide area network (WAN), or the like. Network device 104 may support wired connections, wired connections, or a combination of wired and wireless connections. Devices connected via a wired configuration may connect using cable such as coaxial, optical fiber cable, twisted pair, or the like. Devices connected to network device 104 via a wireless configuration may include one or more transceivers that transmit and receive signals over one or more frequencies. For instance, standard frequency of the Institute of Electrical and Electronics Engineers (IEEE) 802.11 specification such as, but not limited to 2.4 GHz, 5 GHz, 60 GHz, or the like, may be used.

Network device 104 may provide one or more services to the devices connected to it. For instance, network device 104 may provide a network address translation services that masks the Internet Protocol (IP) addresses of the devices connected to it from external devices. Communications from remote devices may be addressed to the IP address of network device 104. Network device 104 may use a translation table to determine the internal IP address of the recipient device and route the communication to the recipient device. Devices outside the network may not be able to distinguish discrete devices within the network using only the IP address.

Network 100 may include a variety of disparate device types, some of which may be incapable of communicating with other devices of network 100 without network device 104. For instance, network device 104 may operate a local area network that enables communication with a distributed set of remote servers 108 such as the Internet. The local area network can include mobile device 112 (such as smartphones and the like) that can communicate over cellular networks to the distributed set of remote servers 108 as well as over Wi-Fi via network devices such as mobile device 112. The local area network may also include computing devices 116. Computing devices 116 may include desktop, laptop, and special purpose data processing devices. Some types of computing devices may not have a radio transceiver for communicating with remote devices and instead rely in network device 104 to communicate with remote devices. Other types of computing devices 116 may communicate wirelessly using Wi-Fi via network device 104.

Modern networks may include a number of specialized computing devices. For instance, display devices 120 may connect to network device 104 to provide additional services such as streaming audio or video. Older display devices may not have transceivers to connect to network device 104. In those cases, a streaming device 124 may connect to network device 104 and output streaming content to an input port of the display device. In addition to display devices 120 and streaming device 124, the network may also support one or more Internet-of-Things (IOT) devices including automation devices such as thermostats, light bulbs, controllers, smart outlets, personal digital assistants, and the like.

II. Bypassing Network Device Restrictions

In some instances, devices may not be able to communicate directly even though the devices are located within the same local area network. For instance, for security reasons, the network device may disable direct communications to protect devices from being accessible by other devices of the network. For instance, if direct communications are permitted, a device connected to the network device may detect other devices on the network, detect personal identifiable information of users associated with the other devices, monitor communications transmitted to or from the other devices, and the like. In some instances, the configuration of a network device may be known to the users of the network. In those instances, communications between devices of the network can be facilitated using an external device, thereby bypassing network device restrictions.

Figure 2:
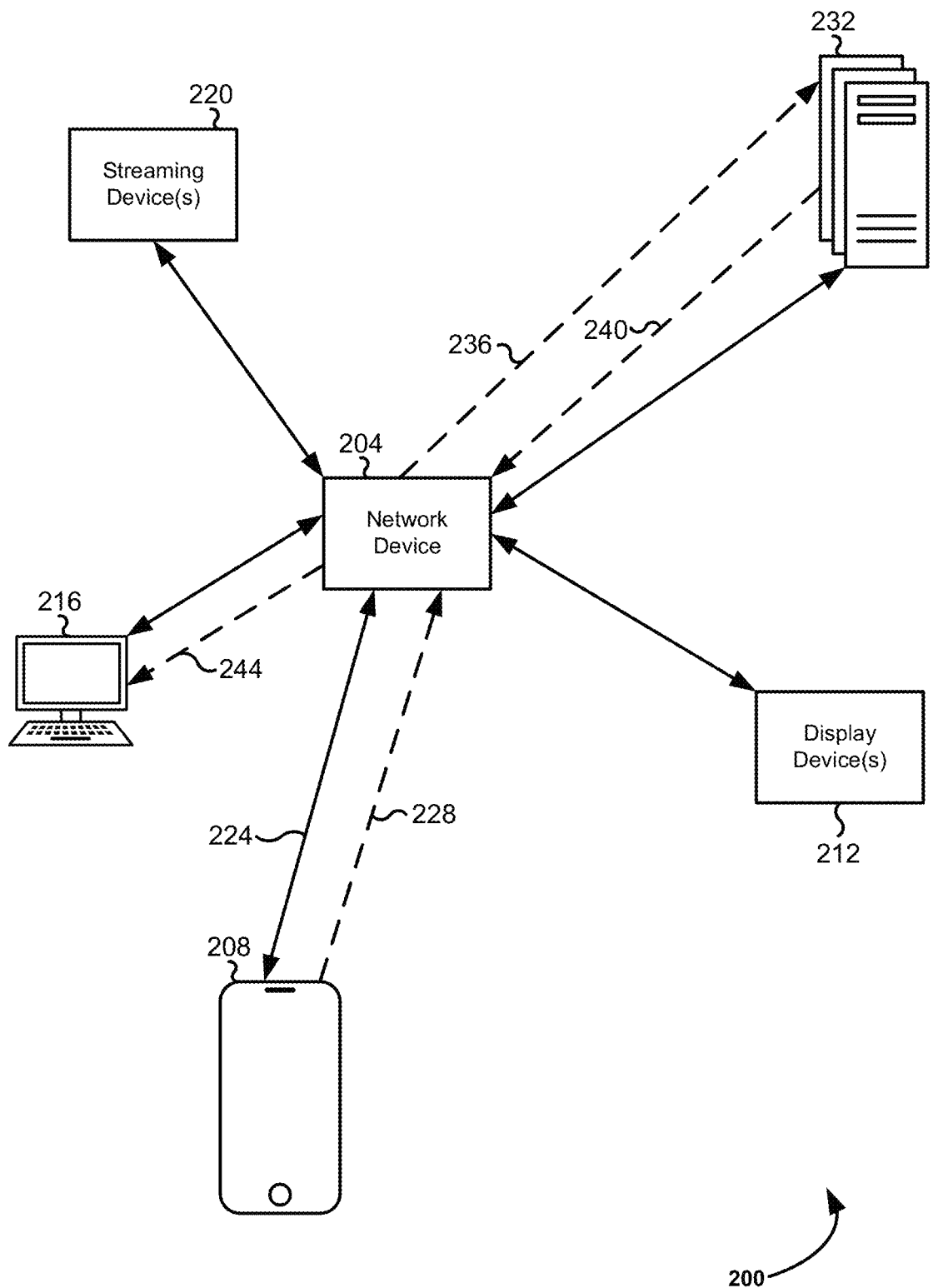
FIG. 2 illustrates a block diagram for establishing direct connection with devices within a network when direct connections are disabled by the network according to at least one aspect of the present disclosure.

FIG. 2 illustrates a block diagram for establishing direct connection with devices within a network when direct connections are disabled by the network according to at least one aspect of the present disclosure.

Network 200 may include a network device 204 that provides a local area network for devices within close proximity to network device 204. Some devices on the network may extend functionality of one or more other devices on the network. For instance, mobile device 208 may stream content that can be displayed by display device 212, computing device 216, or streaming devices 220. In some instances, mobile device may connect directly to the receiving device, such as through Bluetooth or the like. In other instances, such as when mobile device 208 is too far from the receiving device, mobile device 208 may establish a connection 224 with network device 204 and network device 204 can facilitate the connection.

Network device 204 may be configured to prevent direct communications between devices of the local area network to increase a level of security within the network. If the fact that the configuration is set to disable direct communications is known to the devices of the network, communications can be facilitated by an external device. For instance, mobile device may use connection 224 to initiate the stream by sending communication 228 to external server 232 using network device 204. Network device 204 can transmit the communication as communication 236 to external server 232. External server 232 can then transmit communication 240 back to network device 204. Network device 204 may re-transmit communication 240 to the computing device 216 via communication 244. Once received, computing device 216 may begin rendering the streaming content.

In some instances, communications 228-236 and 240-244 may be obfuscated to prevent network device 204 from detecting that communications 228-236 and 240-244 correspond to the same transaction. For instance, the external server 232 may receive packets via one IP address and re-transmit the packets from a separate IP address, though this may require a second connection between network device 204 and external server 232. For another example, mobile device 208 may encrypt some or all of the packets transmitted to external server 232 using a first encryption key. External server 232 may re-transmit the encrypted packet, encrypt the packet a second time using a second encryption key before re-transmitting the encrypted packet, or decrypt the packet and re-encrypt the packet using the second encryption key. Mobile device 208 may have access to the first and/or second encryption keys to decode the packets and render the content of the stream. In other instances, the communications between mobile device 208, external server 232, and computing device 216 may not be obfuscated.

Accordingly, mobile device 208 can stream content to other devices within the network, despite network device 204 being configured to prevent direct communications. In some instances, in order to establish a stream using an external device in restrictive networks such as network 200, network device 204 may first detect that direct communications are disabled by network device 204. Various ways to perform the detection are described below.

III. Detecting Network Device Configuration Using Multiple Devices

Network devices may not broadcast its particular configuration to the devices of the network, which may prevent some devices from operation correctly. For instance, many device's rely on other devices within the network to perform or request services. A device that attempts to connect to another device of the network may be prevented from doing so without an indication as to why the connection was blocked. If the network device configuration is known to the devices of the network, remedial action may be taken to restore the correct operation of the devices of the network. Two or more devices may coordinate to execute a joint network diagnostic routine. The joint network diagnostic routine may transmit data packets from one device addressed to another. By monitoring the data packets, the network device configuration can be determined.

Figure 3:
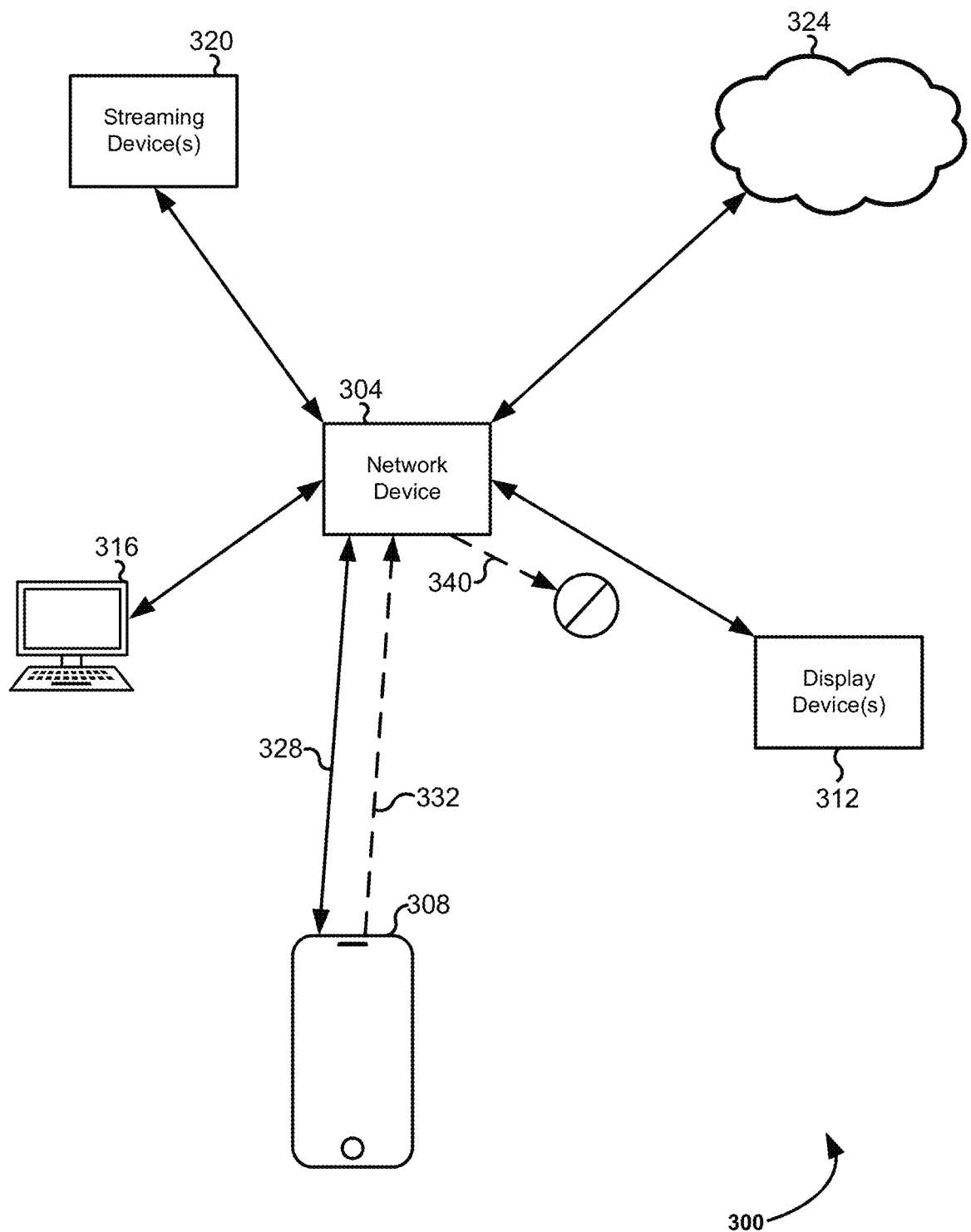
FIG. 3 illustrates a block diagram for detecting the configuration of network devices using a two or more devices according to at least one aspect of the present disclosure.

FIG. 3 illustrates a block diagram for detecting the configuration of network devices using a two or more devices according to at least one aspect of the present disclosure. Network 300 includes network device 304, which may be configured to prevent direct connections or communications from being transmitted to devices within the network. Network device 304 may be any type of network that enables multiple devices to connect to remote network 324 such as Internet. For instance, network 300 may include mobile devices 308, display devices 312, computing devices 316, streaming devices 320, and/or other devices (not shown) configured to connect to remote devices through a network device. Devices of the network may communicate with a remote network 324 such as Internet, a cloud network, a server, or the like.

Devices of network 300 may attempt to establish a connection with other devices of the network to communicate or transfer data. Since network device 304 is configured to prevent direct communications, devices on the network may not be able to connect or communicate directly with other devices on the network. If the configuration of network device 304 can be detected by the devices of the network, then the devices of network may use an external device through network device 304 to establish communications (in such a manner as described in connection to FIG. 2 above). If the configuration of network device 304 cannot be detected, devices of the network may not be able to determine that the cause of not being able to establish communications with another device of the network is due to the configuration of the network device. Instead, a transmitting device may only detect that all of the packets that were transmitted to a receiving device were dropped. The communications error could be due, for example, to an error at the transmitting device, the receiving device, or network device 304 or to the configuration of the network device. The transmitting device can detect an error, but cannot detect the root cause of the error to correct it.

For instance, mobile device 308 may attempt to establish a direct connection to a display device of display devices 312 using network device 304. Mobile device may use connection 328 with network device 304 to transmit a communication 332 to network device 304 addressed to the display device. The communication may include one or more packets of data to establish the connection. Network device 304, having been configured to deny direct connections or communications, will drop the packets 340 rather than transmit the packets to the display device.

In some instances, mobile device 308 will not receive an error message as to the cause of the dropped packets. Mobile device 308 may attempt to execute diagnostics to isolate and correct the communication error. If mobile device 308 is the only device to execute diagnostics, then mobile device 308 may only determine whether mobile device 308 is the source of the communication error. However, if two or more devices of the network can coordinate the network diagnostics, then it may be determined that the source of communication error is the network device 304.

In some instances, it may also be determined that mobile device 308 is configured to prevent direct connections. For example, mobile device 308 and display device 312 may execute a joint network diagnostic routine that systematically attempts to transmit packets to each other and to one or more external devices such as to device of remote network 324. If the packets from mobile device 308 do not reach display device 312, but do reach the external devices then the communication error is likely not caused by mobile device 308. Similarly, if the packets from display device 312 do not reach mobile device 308, but do reach the external devices then the communication error is likely not caused by display device 312. Further, since the packets from each of mobile device 308 and display device 312 were transmitted to the external devices through network device 304, it can be determined that network device 304 is operational and that the cause of the communication error is a setting of network device 304 that is disabling communications.

If the packets from mobile device 308 do not reach display device 312, and do not reach the external devices, then it may be determined that the communication error may be caused by mobile device 308 and/or network device 304. If the packets from display device 312 do not reach mobile device 308, and do not reach the external devices, then it may be determined that the communication error may be caused by display device 312 and/or network device 304. If packets from both mobile device 308 and display device 312 do not reach other and do not reach the external devices then the communication error may be caused by any of mobile device 308, display device 312, and/or network device 304. In these cases, it may not be possible to diagnose the communication the error with even just two devices. The more devices that cooperate in the network diagnostics, the particular device that caused the communication error may be detected with higher probability.

IV. Detecting Network Device Configuration Using a Single Device

In some instances, it may still be possible to detect the network configuration even when other devices cannot execute a joint network diagnostic routine. For instance, a computing device may connect to a network in which other devices of the network are either unknown or outside of the control of the computing device or its user. The computing device may not be able to coordinate with other devices to execute a joint network diagnostic routine. The network configuration, being unknown, may render e render the services offered or requested by the computing device inoperable. Yet, the computing device may be able to execute a network diagnostic routine by itself to detect the network configuration in situations where other devices are unknown or outside the computing device's control.

A. Communication Flow with Network Devices

Figure 4:
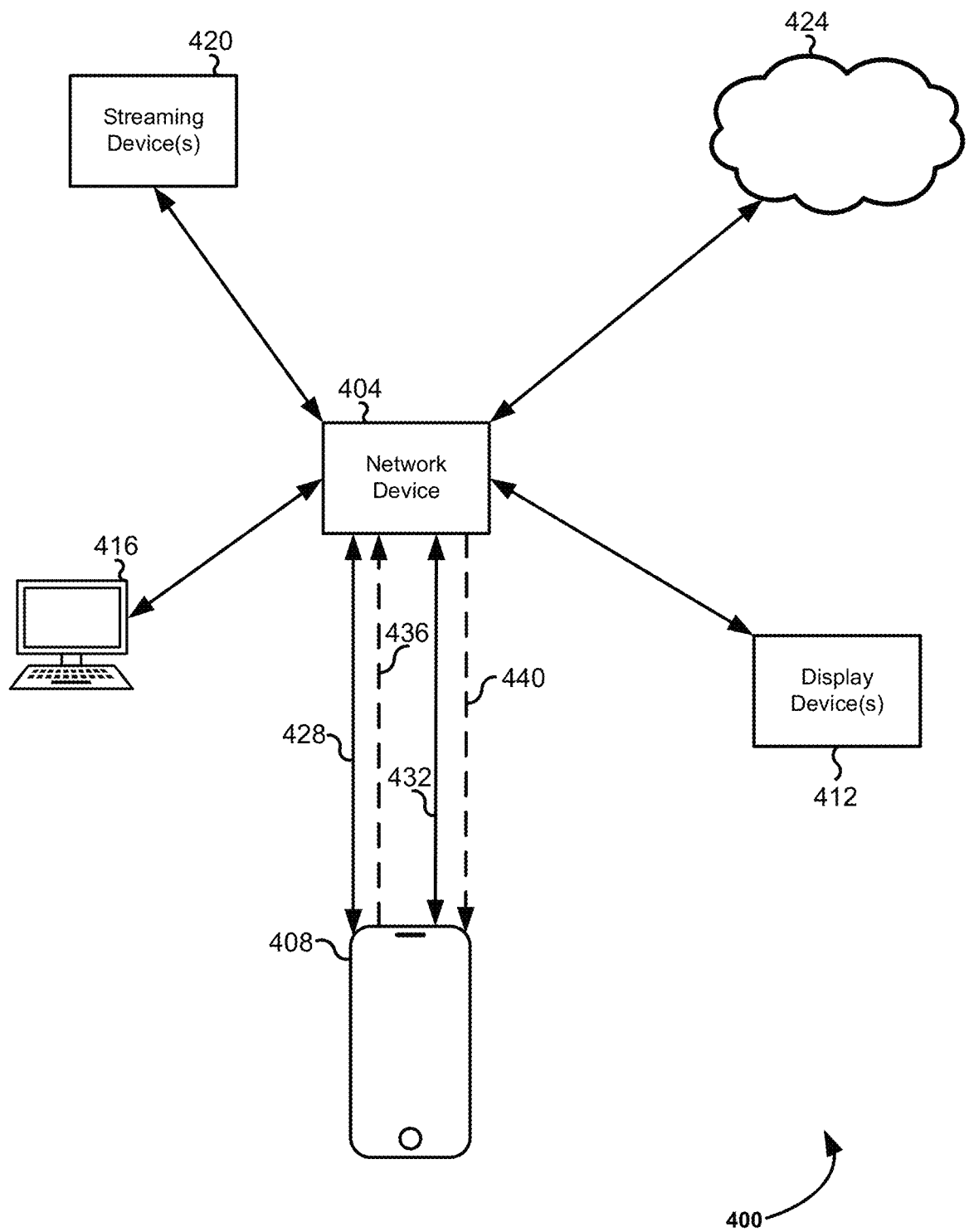
FIG. 4 illustrates a block diagram for detecting the configuration of network devices using a single device according to at least one aspect of the present disclosure.

FIG. 4 illustrates a block diagram for detecting the configuration of network devices using a single device according to at least one aspect of the present disclosure. Network 400 may include a network device 404 that enables mobile devices 408, display devices 412, computing devices 416, streaming devices 420, other devices (not shown) to communicate with networks. Mobile device 408 may preemptively execute a network diagnostic routine for a purpose of detecting the configuration of network device 404. Mobile device 408 may also or alternatively execute the network diagnostic routine in response to a communication error detected when attempting to connect to another device of the network. The configuration of network device 404 may be detected, even though this was not the direct trigger for executing the network diagnostic routine.

The network diagnostic routine may be executed by any device of the network. For instance, mobile device 408 may a establish a first connection 428 with network device 404 using a first media access control (MAC) address of mobile device 408. Establishing a connection may include transmitting a packet with the mobile device's MAC address and receiving from network device 404 a first IP address. Mobile device 408 may establish a second connection 432 with network device 404 using a second MAC address and receiving from network device 404 a second IP address. In some instances, mobile device 408 may have two or more transceivers for wireless communications with each transceiver having its own MAC address. In other instances, mobile device 408 may generate a virtual MAC address. For instance, firmware of the mobile device may be modified to generate a pseudo-random virtual address. The virtual address may be generated upon execution of the network diagnostic routine. A virtual MAC address may be generated with execution of the network diagnostic routine. In other instances, the virtual MAC address may be static such that the same virtual MAC address may be used each time the network diagnostic routine is executed.

Mobile device 408 may attempt to establish a connection between the first IP address and the second IP address (or vice versa) by transmitting a connection request communication 436 to network device 404. Network device 404 may be configured to allow direct communications or deny direct connections. If direct communication is enabled, mobile device 408 may receive a connection request via communication 440 on the second connection 423 from network device 404. If direct communications are disabled, then network device 404 will drop the packets associated with the connection request communication.

Mobile device may transmit additional communications using the first connection 428 and/or the second connection 432 to one or more other devices of the network and/or remote network 424 to verify the operational status of its own communication capability. If any of the other devices transmit a response to the additional communications, then it may be determined that network device 404 is preventing direct communications with other devices on the network. In this manner, the configuration of network device 404 may be determined using a single device that avoids the need to coordinate with two or more devices.

In some instances, mobile device 408 may execute a remedial routine to enable communications to other devices on the network such as display device 412. For instance, mobile device 408 may issue a configuration request to network device 404 to modify the configuration of network device 404 to allow for direct communications. In some instances, the configuration request may cause network device 404 to be reconfigured to allow direct communications. In other instances, the configuration request may include an identifier of each device to which the mobile device 408 is attempting a direct connection.

Network device 404 may generate an exception table with an entry for each device. The exception table may include, for each entry, an identifier of two or more devices, an IP address of each device, a MAC address of each device, and/or an expiration time interval. The expiration time interval may be predetermined or selected by one or more devices subject to the exception. Upon the expiration time interval lapsing, the connection between all devices within the entry of the exception table will be dropped by the network device. When the connection drops, the connection may be removed from the exception table. Network device 404 may require each device to consent to direct communications before establishing direct connections. When a device transmits the configuration request, network device 404 may generate a request to each device included in the configuration request for consent to establish a direct connection.

In still yet other instances, mobile device may establish a connection with one or more remote devices of remote network 424 and use the one or more remote devices to bypass the direct connection with display device 412 in a manner similar to that described in connection with FIG. 2 above. Mobile device may request that the one or more remote devices establish a separate connection with display device 412. Mobile device 408 may transmit communications for display device 412 by transmitting the communication to the one or more remote devices. The one or more remote devices may re-transmit the communications to the display device.

In some instances, mobile device 408 may periodically execute the network diagnostic routine to detect the configuration of network device 404 periodically in predetermined intervals. In other instances, mobile device 408 may periodically execute the network diagnostic routine to detect the configuration of network device 404 in response to a connectivity event such as a communication error when attempting to communicate with another device of the network. In still yet other instances, mobile device 408 may execute the network diagnostic routine upon connecting to network device 404 for the first time (or every time).

B. Example Interfaces of Mobile Devices

Figure 5A:
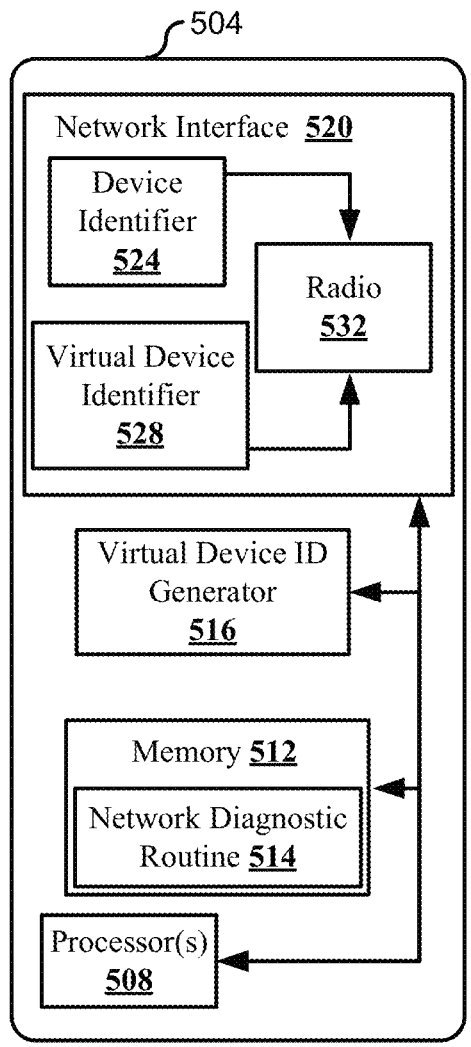
FIG. 5A illustrate a block diagrams of a mobile device with a single network interface according to at least one aspect of the present disclosure.

FIG. 5A illustrate a block diagrams of a mobile device with a single network interface according to at least one aspect of the present disclosure. Mobile device 504 includes one or more processors 508 that execute instructions stored in memory 512. For instance, the instructions can include network diagnostic routine 514 that may be executed by the one or more processors 508. Network diagnostic routine 514 may cause the one or more processors 508 to establish two connections with a network device using a single network interface to determine the configuration of the network device. Virtual device ID generator 516 includes hardware, or software executable by the one or more processors 508, to generate a virtual device identifier. A virtual device identifier may be a universally unique identifier (UUID), a MAC address, or any alphanumeric sequence that identifies a device such as mobile device 504.

The instructions for network diagnostic routine 514 may cause the one or more processors 508 to issue a request to virtual device ID generator 516 to generate a new virtual device identifier to enable network interface 520 to establish a second connection with the network device. In some instances, virtual device ID generator 516 may generate a static virtual device identifier that does not change. In other instances, a virtual device identifier may be dynamic such that a different virtual device identifier may be generated each time that mobile device 504 attempts to establish a second connection. Virtual device identifier may be generated once or multiple time. For instance, the virtual device identifier may be generated the first time a second connection is to be established, each time a second connection is to be established, every predetermined time interval, or the like. In some instances, a generated virtual device identifier may be regenerated periodically such as upon a time interval of a predetermined duration expiring, upon receiving a command, detecting a communication error, or the like.

Network interface 520 may enable mobile device 504 to communicate with external devices through wired and/or wireless communications. Network interface 520 may include a device identifier 524 that may be a UUID, a MAC address, or any alphanumeric sequence that identifies network interface 520. In some instances, device identifiers of network interfaces may be stored in read-only memory such that the device identifiers cannot be changed. In other instances, device identifiers may be superseded by a generated device identifier. For instance, virtual device ID generator 516 may generated a virtual device identifier may be used in place of device identifier 524. Virtual device identifiers generated by virtual device ID generator 516 may be stored in virtual device identifier 528. In some instances, virtual device ID generator 516 may be a component of network interface 520.

The instructions for the network diagnostic routine 514 can cause network interface 520 to establish a first connection using radio 532. Radio 532 may include an antenna and a transceiver that is configured to transmit and receive signals using the antenna. Radio 532 may transmit a request to the network device that includes the device identifier 524 or the virtual device identifier 528. The network device may respond by assigning and transmitting an IP address to mobile device 504. The IP represents virtual location of the mobile device 504 such that communications received by the network device addressed to the IP address can be transmitted to network interface A 540. The instructions for the network diagnostic routine 514 can cause network interface 520 to use the other device identifier (e.g., the device identifier not used to establish the first connection) to establish a second connection with the network device, which the network device may assign a second IP address. Since the device identifier 524 and the virtual device identifier 528 are different, the network device may not detect that the mobile device is establishing a second connection.

Since there is only a single radio (e.g., radio 532), wireless communications over the two connections with the network device may be limited. For instance, signals may be transmitted or received over one connection at a time. If radio 532 transmits a signal over one connection, radio 532 may not be available to transmit or receive signals over the other connection. A network controller (not shown) of network interface 520 may operate radio 532 to minimize conflicts between the connections. For instance, network controller may use a communications queue and a scheduler to ensure communications can be transmitted by either connection without a transmission on one connection conflicting with a transmission on another connection.

The instructions for the network diagnostic routine 514 can cause radio 532 to transmit a data packet over one connection addressed to the IP address assigned to the other connection. A configuration of the network device can be determined by listening for the data packet over the other connection. If the data packet is received by the other connection, then it can be determined that direct communications (through the network device) with other devices connected to the network device are enabled. If the data packet is not received, then it can be determined that direct communications with other devices connected to the network device are disabled. Mobile device 504 may generate an error message and optionally execute one or more remedial operations. Once the configuration of the network device is determined, the second connection may be severed and the virtual device identifier may no longer be necessary. The mobile device may delete the virtual device identifier once the second connection is disconnected or the virtual device identifier may be retained to establish a subsequent second connection.

Figure 5B:
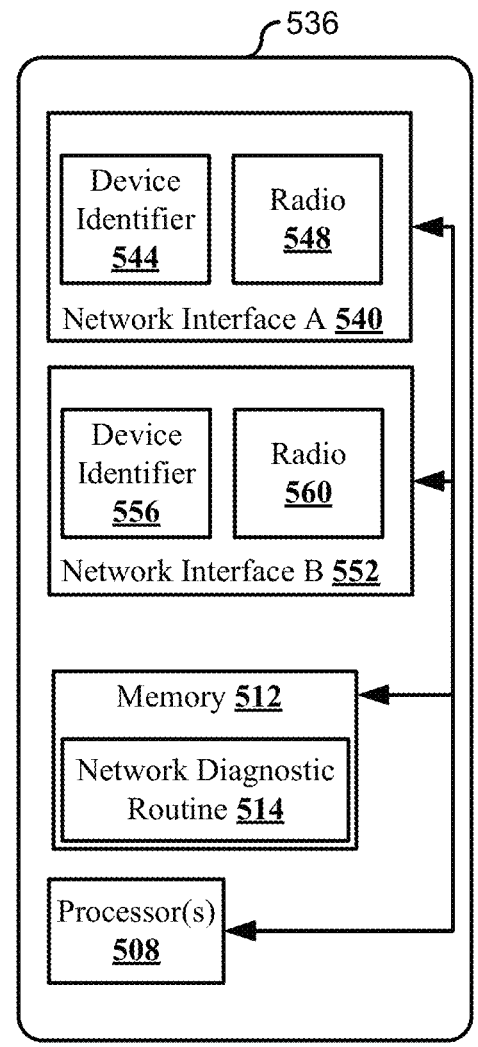
FIG. 5B illustrate a block diagrams of a mobile device with a multiple network interfaces according to at least one aspect of the present disclosure.

FIG. 5B illustrate a block diagrams of a mobile device with a multiple network interfaces according to at least one aspect of the present disclosure. Mobile device 536 includes one or more processors 508 and instructions executable by the one or more processors stored in memory 512 that include network diagnostic routine 514. Network diagnostic routine 514 may cause the one or more processors 508 to establish two connections with a network device in order to determine the configuration of the network device.

The instructions may cause network interface A 550 to establish a connection with a network device using device identifier 544 and radio 548. Device identifier 544 may be a UUID, a MAC address, or any alphanumeric sequence that identifies network interface A 540 of mobile device 536. Network interface A 540 may establish a connection by transmitting a connection request using radio 548 to a network device. The connection request may include device identifier 544. The network device may establish the connection and assign a first IP address to network interface A 540.

The instructions for network diagnostic routine 514 may cause mobile device 546 to establish another connection using network interface B 552. Network interface B 552 may include device identifier 556 and radio 560. Device identifier 556 may be a UUID, a MAC address, or any alphanumeric sequence that identifies network interface B 552 of mobile device 536. Network interface B 552 may establish a connection by transmitting a connection request to the network device. The connection request may include device identifier 556. The network device may establish the connection and assign a second IP address to network interface B 552. Each network interface may operate independently to transmit and/or receive signals in parallel (i.e. simultaneously) with other network interfaces. Radio 548 may operate on a different frequency band from radio 560 to prevent signal noise from preventing signal from being transmitted or received. In some instances, mobile device 536 may include more than two network interfaces with each network interface enabling an additional concurrent connection to be maintained by the network device.

The instructions for network diagnostic routine 514 may cause the network interface A 540 to transmit a data packet to the network device over the connection established by network interface A 540. The data packet may be addressed to the second IP address that is assigned to network interface B 552. Network interface B 552 may listen for the data packet. The data packet may be used to determine the configuration of network device.

Network interfaces 520, 540, and 552 may communicate over wired or wireless connections. Although wireless connections using the respective radios of the network interfaces were described above, the processes may operate in a substantially similar manner over wired connections.

C. Method for Detecting Network Device Configuration

Figure 6:
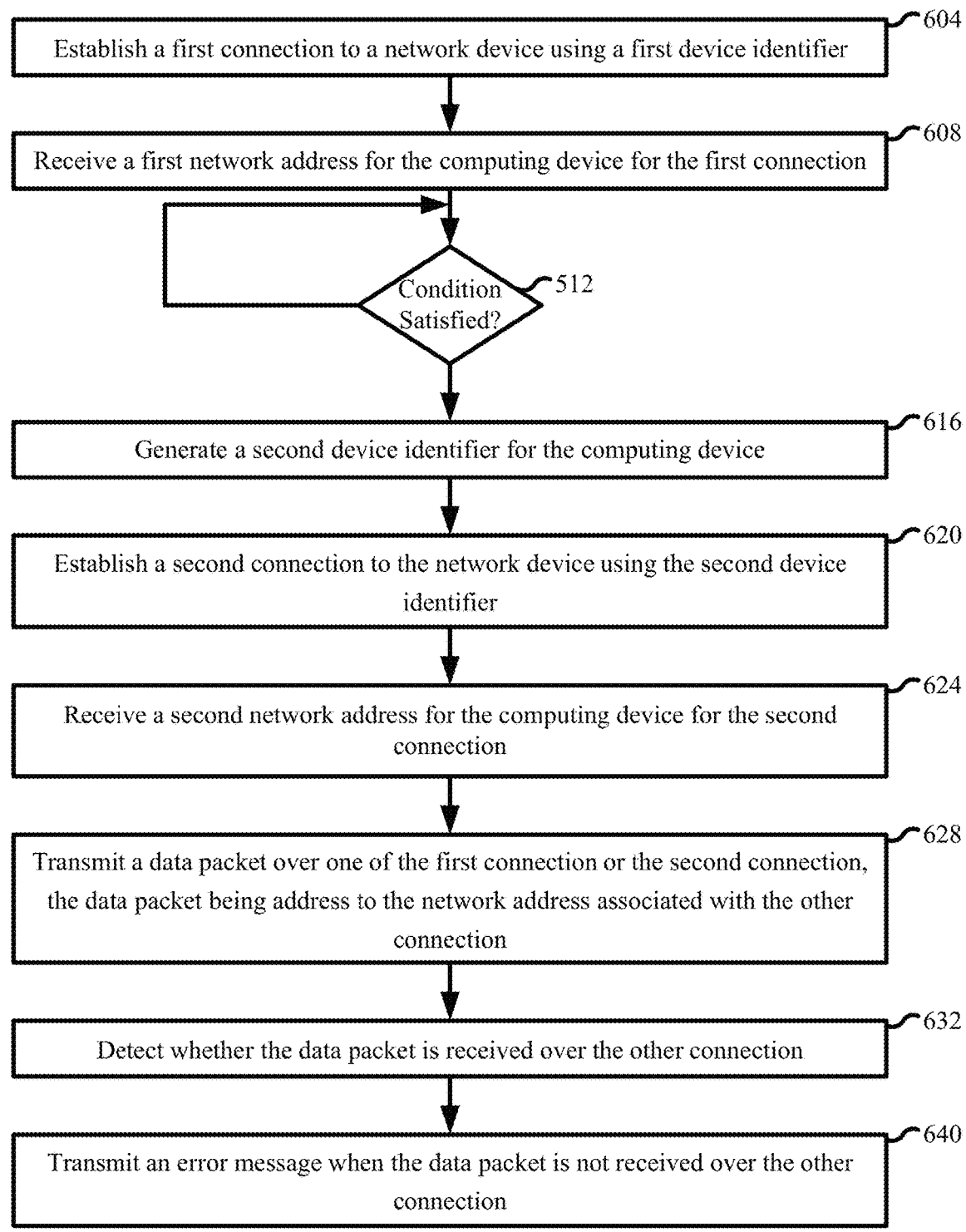
FIG. 6 illustrates an exemplary flowchart of a process for detecting operational settings of network devices using a single device according to at least one aspect of the present disclosure.

FIG. 6 illustrates an exemplary flowchart of a process 600 for detecting operational settings of network devices using a single device according to at least one aspect of the present disclosure. Process 600 may be implemented by any device connected to a network device to detect a setting of a network device. For instance, if direct communications (through the network device and) between devices connected to the network device are disabled, some services provided by devices of the network may be inoperable. However, when the settings of the network device are known or detected, such as through process 600, the operability of some services can be restored.

At block 604, a computing device establishes a first connection with a network device using a first device identifier. The first device identifier may be UUID, a MAC address, or any alphanumeric sequence that identifies the computing device. The network device may be any device configured to connect multiple locally positioned device to one or more remote devices or networks. For instance, the network device may be a gateway router, network switch, or the like. The computing device may be a stationary computing device such as a desktop computer or a mobile device such as a laptop, smartphone, or the like.

Computing devices may establish a first connection with network devices for a variety of purposes. For instance, computing devices may lack the capability of communicating to remote device and may establish the first connection to the network device to enable communication to the remote devices. Computing devices that communicate over one communications protocol (e.g. cellular, Bluetooth, etc.) may establish the first connection to communicate over different communications protocol (e.g., TCP/IP). Computing devices may use network device to obtain services from the network device or other devices of the network or to provide services to the network device or other devices of the network.

At block 608, a first network address may be received by the computing device from the network device. The first network address may be an UUID, an IP address, or any alphanumeric sequence that identifies the first connection with the computing device. The network device may use the first network address to address communications to the computing device rather than the first device identifier. In some instances, the first network address may be static such that the network device may use the same first network address for the computing device each time the computing device connects to the network device. In other instances, the first network address may be dynamically generated such that a different first network address may be generated for the computing device every time the computing device connects to the network device. In those instances, the first network address may be regenerated periodically even if the computing does not reconnect the first connection such as upon the expiration of a predetermined time interval.

At block 612, it is determined whether a condition for detecting the current configuration of the network device has been satisfied. The condition may be, for example: (1) the first time the computing device establishes a connection to the network device, (2) every time the computing device establishes a connection with the network device, (3) the expiration of a time interval of a predefined duration, (4) the occurrence of an event, (5) when the computing device detects a communication error, (6) prior to the computing device attempting to establish a connection to another device within the same network, (7) after the computing device attempts to establish a connection to another device within the same network; (8) combinations thereof, and the like. If the condition is not satisfied then the process waits at block 612 until the condition becomes satisfied or the computing device disconnects from the network. If the condition has been satisfied, then the process continues.

At block 616, the computing device generates a second device identifier that is different from the first device identifier. The second device identifier may be a UUID, an MAC address, or any alphanumeric sequence that identifies the computing device. In some instances, the second device identifier may be of a same type as the first device identifier. In other instances, the second device identifier may of a different type from the first device identifier. If the computing device includes two network interfaces then the first network identifier may be a network identifier of the first network interface and the second device identifier may the network identifier of the second network interface. If the computing device does not have separate network interfaces, the first network identifier may be the network identifier of the network interface and the second device identifier may be a virtual network identifier. The virtual network identifier may be persistently stored on the computing device or generated upon the condition being satisfied. The second device identifier may be static such that the second device identifier does not change or dynamic such that the second device identifier may change periodically such as each time the condition is satisfied and/or the expiration of a time interval.

At block 620, the network device may use the second device identifier to establish a second connection with the network device. The second connection may be maintained by the computing device in parallel to the first connection where communications may be transmitted and received using either connections. If two network interfaces are present, then computing device may transmit and/or receive communications on both connections at the same time. If the computing device does not include a second network interface, then a network controller of the computing device may schedule the operations of the network interface such that communications can be transmitted or received using the first and/or second connections without the communications of one connection interfering with the communications on the other connection.

At block 624, a second network address for the second connection may be received by the computing device from the network device. The second network address may be a UUID, an IP address, or any alphanumeric sequence that identifies the second connection with the computing device. The network device may use the second network address to address communications to the computing device over the second connection. In some instances, the second network identifier may be static such that the network device may use the same second network address for the computing device each time the computing device establishes a second connection to the network device. In other instances, the second network address may be dynamically generated such that a different second network address may be generated for the second connection every time the computing device establishes a second connection to the network device. In those instances, the second network address may be regenerated periodically even when the computing device does not re-connect the second connection such as upon the expiration of a predetermined time interval.

At block 628, the computing device transmits a data packet over the first or second connection addressed to the network address of the other connection. For instance, the computing device may transmit the data packet over the first connection addressed to the second network address. The data packet may be addressed to the second network address as to attempt to cause the network device to re-transmits the data packet back to the computing device over the second connection. On the other hand, the computing device may transmit the data packet over the second connection addressed to the first network address instead of using the first connection. The data packet may be addressed to the first network address as to attempt to cause the network device to re-transmits the data packet back to the computing device over the first connection.

In some instances, the data packet may be included with a broadcast message transmitted by the computing device to the devices connected to the network device. The broadcast message may indicate the availability of a particular service of the computing device or a request for the availability of a particular service of other devices of the network. For instance, the broadcast message may be an indication that the computing device is configured to stream media or receive a media stream. For another instance, the broadcast message may be a request for identification from devices that are capable of rendering the media stream.

At block 632, the computing device detects whether the data packet is received on the other connection. If the data packet is received then it is determined that the configuration of network allows direct communications between devices of the network. The computing device may then disconnect one of the connections with the network device. In some instances, it may be the second connection that is disconnected. In other instances, it may be the first connection that is disconnected. In still yet other instances, both connections may be maintained. If a virtual device identifier is used to establish a connection, the virtual device identifier may be deleted upon that connection being disconnected. The computing device may then establish a connection with another device to, for example, stream content to or otherwise communicate with over any of the remaining connections. On the other hand, if the data packet is not detected over the other connection, then it can be determined that the network device is configured to disable direct communications with other devices of the network and the process proceeds to block 640. In some instances, the computing device may wait a predetermined time interval before proceeding to block 640 to ensure that the data packet was dropped rather than delayed.

At block 640, the computing device may generate an error message indicating that the network device is configured to disable direct communications with other devices of the network. The error message may include the first device identifier, the first network address, the second device identifier, the second network address, a device identifier of the network device, a network address of the network device, a time stamp, an alphanumeric code indicating the type of error, combinations thereof, and the like. In some instances, the computing device may transmit the error message to the network device or to another device.

In some instances, the computing device may execute a remedial routine to bypass the restrictions of the network device. For instance, the computing device may establish a connection with a remote device and use the remote device as a communication proxy. The computing device may transmit a new communication addressed to a particular device within the network to the remote device. The remote device may re-transmit the new communication to the particular device within the network. Since the new communication exits the network before being received by the particular device, the network device may re-transmit the new communication rather than dropping the new communication.

Once an error message is generated or transmitted, the computing device may disconnect one of the connections with the network device. In some instances, it may be the second connection that is disconnected. In other instances, it may be the first connection that is disconnected. In still yet other instances, both connections may be maintained. The remaining connections may be used to attempt the remedial routine to establish communications with the other devices of the network. In some instances, the process may return to block 612 in which the computing system may wait until the condition has been satisfied again before proceeding through block 616-640 again. Each block of FIG. 6 may be executed in any particular order or with any particular frequency such as for example, in order, out of order, once, or multiple times without departing from the spirit or scope of the present disclosure.

V. Exemplary Devices

Figure 7:
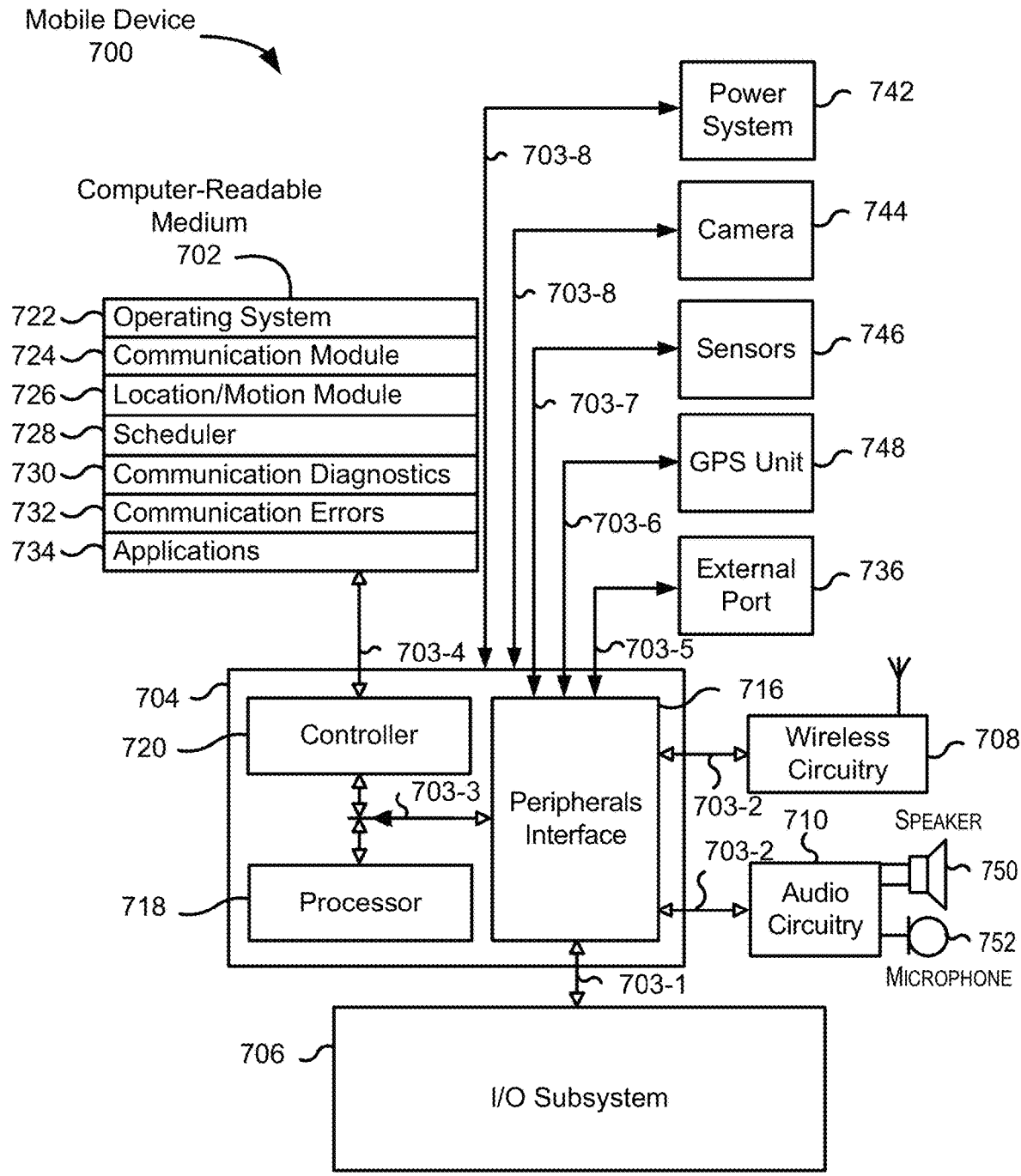
FIG. 7 illustrates a block diagram of an example device according to aspects of the present disclosure.

FIG. 7 is a block diagram of an example device 700, which may be a mobile device. Device 700 generally includes computer-readable medium 702, a processing system 704, an Input/Output (I/O) subsystem 706, wireless circuitry 708, and audio circuitry 710 including speaker 750 and microphone 752. These components may be coupled by one or more communication buses or signal lines 703. Device 700 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 708 can use various protocols, e.g., as described herein.

Wireless circuitry 708 is coupled to processing system 704 via peripherals interface 716. Peripherals interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats for one or more application programs 734 stored on medium 702.

Peripherals interface 716 couple the input and output peripherals of the device to processor 718 and computer-readable medium 702. One or more processors 718 communicate with computer-readable medium 702 via a controller 720. Computer-readable medium 702 can be any device or medium that can store code and/or data for use by one or more processors 718. Medium 702 can include a memory hierarchy, including cache, main memory and secondary memory.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes a camera 744. In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some embodiments, device 700 can include a GPS receiver, sometimes referred to as a GPS unit 748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for device 700. In some embodiments, the software components include an operating system 722, a communication module (or set of instructions) 724, a location module (or set of instructions) 726, a scheduler 728, a communication diagnostic module (or set of instructions) 730, a communication errors table 732, and other applications (or set of instructions) 734, such as a car locator app and a navigation app. Scheduler 728 may include a set of instructions that when executed schedule communication diagnostics 730. Scheduler may schedule communication diagnostics 730 to execute diagnostics periodically or upon detecting a connection event such as a failed connection attempt, a connection with a network device, or a connection with a particular device type. Communication diagnostics 730 may include one or more routines that can test the configuration of connected devices. Communication errors table 734 may store error codes associated with errors raised by communication diagnostics 730. In some instances, communication errors table 732 may store additional information with each error event include an address of the network device, an address of the mobile device, and address of the devices for which a connection was requested, a type of connection request (e.g., to establish a media stream, to transmit data, one time communication, or the like), at timestamp of when the error occurred, and the like. In some instances, errors in communication errors table may be used for further diagnostics.

Operating system 722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., USB, FireWire, Lightning connector, 60-pin connector, etc.) is adapted for coupling directly to other devices or indirectly over a network (e.g., the Internet, wireless LAN, etc.).

Location/motion module 726 can assist in determining the current position (e.g., coordinates or other geographic location identifier) and motion of device 700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 726 receives data from GPS unit 748 and analyzes the signals to determine the current position of the mobile device. In some embodiments, location/motion module 726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 708 and is passed to location/motion module 726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 700 based on the position coordinates of the corresponding transmitters. Regardless of the specific location technology used, location/motion module 726 receives information from which a location fix can be derived, interprets that information, and returns location information, such as geographic coordinates, latitude/longitude, or other location fix data.

The one or more applications 734 on the mobile device can include any applications installed on the device 700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or track pad. In some embodiments, I/O subsystem 706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve software application and the software development processes. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for software energy diagnostics to improve energy consumption of particular software applications. Accordingly, use of such personal information data enables users to improve a particular application used by a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting and processing energy consumption reports, the present technology can be configured to allow users to select to "opt in" or "opt out" of participation in the collection of personal information data during registration for services or anytime thereafter. In another example, users can select not to provide mood-associated data for energy consumption reports. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, energy consumption reports may be obtained based on non-personal information data or a bare minimum amount of personal information, such as the content being requested by the device associated with a user, other non-personal information available from other sources, or publicly available information.

Although the invention has been described with respect to specific embodiments, it will be appreciated that the invention is intended to cover all modifications and equivalents within the scope of the following claims.

What is claimed is:

1. A method comprising:
   establishing, by a computing device, a first connection to a network device using a first device identifier;
   receiving, from the network device, a first network address for the computing device for the first connection;
   detecting a communication error;
   in response to detecting the communication error, generating a second device identifier for the computing device, wherein the second device identifier is a virtual identifier and is different than the first device identifier;
   establishing, by the computing device and using the second device identifier, a second connection to the network device, wherein the computing device maintains the first connection and the second connection at a same time;
   receiving, from the network device, a second network address for the computing device for the second connection; and
   transmitting, by the computing device via the network device, a data packet over one of the first connection or the second connection, the data packet being addressed to the network address associated with the one connection of the first connection and the second connection that did not transmit the data packet;
   detecting whether the data packet is received over the one connection that did not transmit the data packet; and
   transmitting an error message when the data packet is not received over the one connection that did not transmit the data packet.

2. The method of claim 1, wherein the first device identifier and the second device identifier are media access control addresses.

3. The method of claim 1, wherein the communication error corresponds to an attempt to establish a connection to another device within a same network as the computing device.

4. The method of claim 1, wherein the data packet is transmitted using a TCP/IP protocol.

5. The method of claim 1, further comprising:
   receiving, over the one connection that did not transmit the data packet, the data packet;
   severing the second connection with the network device; and
   deleting the second device identifier.

6. The method of claim 1, further comprising:
monitoring the one connection that did not transmit the data packet for the data packet for a predetermined time interval;
determining that the predetermined time interval has expired without receiving the data packet; and
transmitting the error message indicating that the data packet could not be received.

7. The method of claim 1, wherein the data packet includes a broadcast, using the first connection and the first network address, indicating availability of a first service, and wherein the method further comprises:
searching, using the second connection and the second network address, for the first service, wherein the computing device searches for a predetermined time interval;
determining that the predetermined time interval has expired without detecting the first service; and
transmitting the error message as a result of determining that the predetermined time interval has expired without detecting the first service.

8. A system comprising:
one or more processors; and
a non-transitory computer-readable medium storing instructions that when executed by the one or more processors, cause the one or more processors to perform operations including:
establishing, by a computing device, a first connection to a network device using a first device identifier;
receiving, from the network device, a first network address for the computing device for the first connection;
detecting a communication error;
in response to detecting the communication error, generating a second device identifier for the computing device, wherein the second device identifier is a virtual identifier and is different than the first device identifier;
establishing, by the computing device and using the second device identifier, a second connection to the network device, wherein the computing device maintains the first connection and the second connection at a same time;
receiving, from the network device, a second network address for the computing device for the second connection; and
transmitting, by the computing device via the network device, a data packet over one of the first connection or the second connection, the data packet being addressed to the network address associated with the one connection of the first connection and the second connection that did not transmit the data packet;
detecting whether the data packet is received over the one connection that did not transmit the data packet; and
transmitting an error message when the data packet is not received over the one connection that did not transmit the data packet.

9. The system of claim 8, wherein the first device identifier and the second device identifier are media access control addresses.

10. The system of claim 8, wherein the communication error corresponds to an attempt to establish a connection to another device within a same network as the system.

11. The system of claim 8, wherein the data packet is transmitted using a TCP/IP protocol.

12. The system of claim 8, wherein the operations further include:
receiving, over the one connection that did not transmit the data packet, the data packet;
severing the second connection with the network device; and
deleting the second device identifier.

13. The system of claim 8, wherein the operations further include:
monitoring the one connection that did not transmit the data packet for the data packet for a predetermined time interval;
determining that the predetermined time interval has expired without receiving the data packet; and
transmitting the error message indicating that the data packet could not be received.

14. The system of claim 8, wherein the data packet includes a broadcast, using the first connection and the first network address, indicating availability of a first service, and wherein the operations further include:
searching, using the second connection and the second network address, for the first service, wherein the computing device searches for a predetermined time interval;
determining that the predetermined time interval has expired without detecting the first service; and
transmitting the error message as a result of determining that the predetermined time interval has expired without detecting the first service.

15. A non-transitory computer-readable medium storing instructions that when executed by one or more processors, cause the one or more processors to perform operations including:
establishing, by a computing device, a first connection to a network device using a first device identifier;
receiving, from the network device, a first network address for the computing device for the first connection;
detecting that a condition for detecting a current configuration of the network device has been satisfied;
in response to detecting that the condition has been satisfied, generating a second device identifier for the computing device, wherein the second device identifier is a virtual identifier and is different than the first device identifier;
establishing, by the computing device and using the second device identifier, a second connection to the network device, wherein the computing device maintains the first connection and the second connection at a same time;
receiving, from the network device, a second network address for the computing device for the second connection; and
transmitting, by the computing device via the network device, a data packet over one of the first connection or the second connection, the data packet being addressed to the network address associated with the one connection of the first connection and the second connection that did not transmit the data packet;
detecting whether the data packet is received over the one connection that did not transmit the data packet; and
transmitting an error message when the data packet is not received over the one connection that did not transmit the data packet.

16. The non-transitory computer-readable medium of claim 15, wherein the first device identifier and the second device identifier are media access control addresses.

17. The non-transitory computer-readable medium of claim 15, wherein the condition is satisfied upon attempting to establish a connection to another device within a same network as the computing device.

18. The non-transitory computer-readable medium of claim 15, wherein the data packet is transmitted using a TCP/IP protocol.

19. The non-transitory computer-readable medium of claim 15, wherein the operations further include:
   receiving, over the one connection that did not transmit the data packet, the data packet;
   severing the second connection with the network device; and
   deleting the second device identifier.

20. The non-transitory computer-readable medium of claim 15, wherein the operations further include:
   monitoring the one connection that did not transmit the data packet for the data packet for a predetermined time interval;
   determining that the predetermined time interval has expired without receiving the data packet; and
   transmitting the error message indicating that the data packet could not be received.

\* \* \* \* \*